March 18, 1924.
P. DOW
ICE CUTTING DEVICE
Filed May 19, 1922
1,487,547
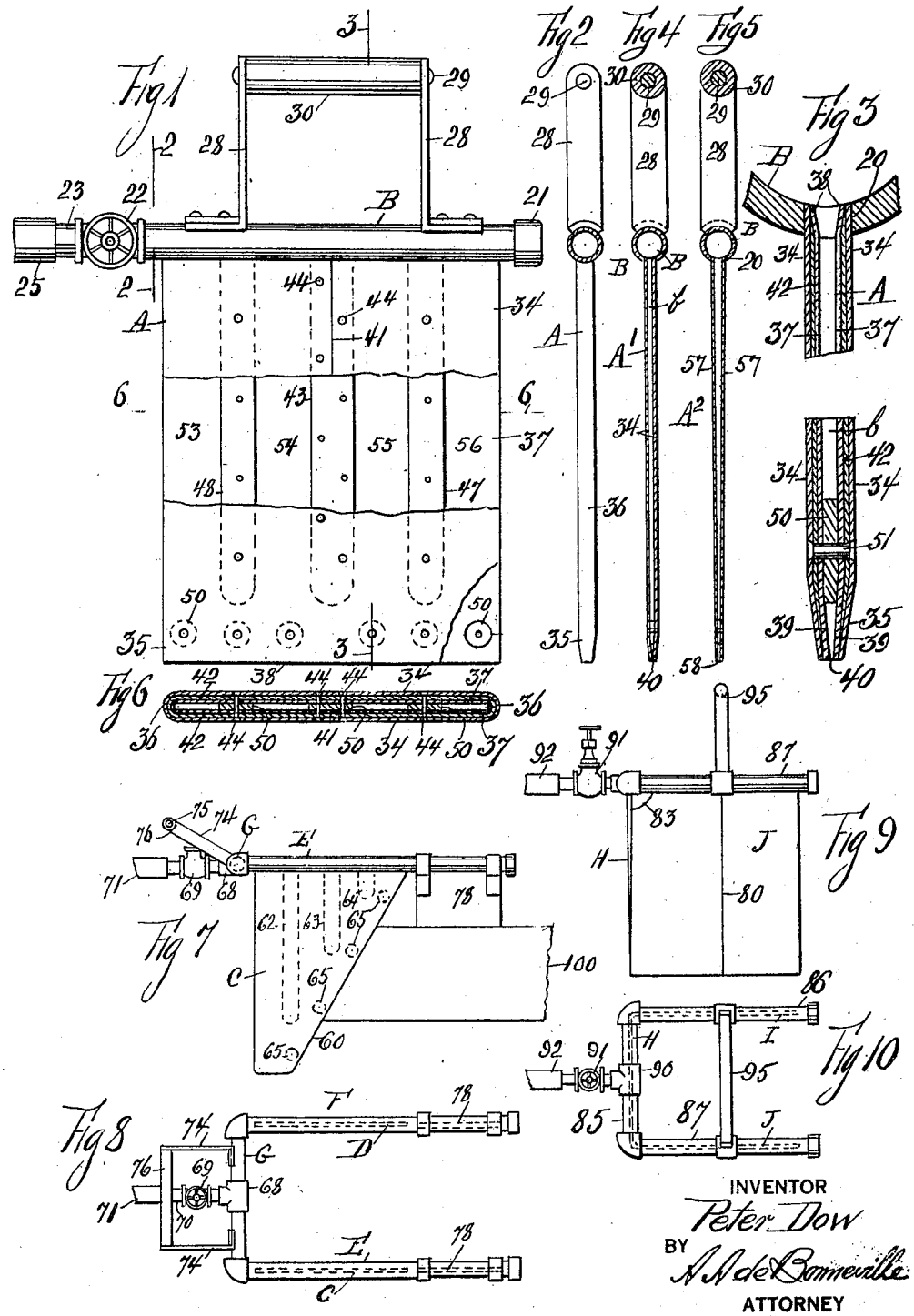
INVENTOR
Peter Dow
BY
A. N. de Bonneville
ATTORNEY Patented Mar. 18, 1924.

1,487,547

UNITED STATES PATENT OFFICE.

PETER DOW, OF LAKE HOPATCONG, NEW JERSEY, ASSIGNOR OF SEVENTY-FIVE PER CENT TO CONSUMERS COAL AND ICE COMPANY, OF BAYONNE, NEW JERSEY, A CORPORATION OF NEW JERSEY.

ICE-CUTTING DEVICE.

Application filed May 19, 1922. Serial No. 562,242.

*To all whom it may concern:*

Be it known that I, PETER DOW, a citizen of the United States, and resident of Nolans Point, Lake Hopatcong, in the county of Morris and State of New Jersey, have invented certain new and useful Improvements in an Ice-Cutting Device, of which the following is a specification.

This invention relates to an ice cutting device. The object of the invention is the production of a device, by means of which ice, snow or various other frozen materials may be easily cut with a negligible loss of the material operated upon resulting from the cutting. A second object of the invention is the production of such a device, that will maintain its form and contour with rough and severe use. A third object is the production of a cutting device that is self-cleaning when being used. A fourth object of the invention is the production of a cutting device operating with a hot fluid discharged at its cutting edge, and with the body of the device protected by a heat insulating agent. A fifth object of the invention is the production of a cutting device by means of which the frozen material operated upon is cut by a stream of hot fluid that does not lose any heat through the sides of the blades of the device. Other objects will be evident from the following description and claims.

In the accompanying drawings Fig. 1 represents a side elevation of an exemplification of the Ice Cuting Device with a portion thereof broken away; Fig. 2 shows a left hand side view of Fig. 1 with a section of Fig. 1 on the line 2, 2; Fig. 3 indicates an enlarged fragmentary section of Fig. 1 on the line 3, 3; Figs. 4 and 5 show sections similar to Fig. 3 with modifications; Fig. 6 shows a section of Fig. 1 on the line 6, 6; Fig. 7 represents an elevation of a modified ice cutting device; Fig. 8 is a top plan view of Fig. 7; Fig. 9 represents an elevation of another modification of the ice cutting device and Fig. 10 is a top plan view of Fig. 9.

Referring to Figs. 1, 2 and 3, the cutting device is shown to comprise a hollow blade indicated in its entirety by the letter A. The blade A has its inlet end fastened to the walls of a longitudinal opening 20 in the supply pipe B, and preferably by means of solder. The pipe B at one end thereof has connected thereto the removable cap 21, and to its other end is connected the valve 22 with the nipple 23 and the hose 25. An operating handle for the pipe B comprises a pair of brackets 28, which have one end of each connected to said pipe. A pin 29 connects the other ends of the brackets 28, and a handle bar 30 is supported on the pin 29 between said brackets 28.

The interior of the blade A comprises a chamber $b$, for the operating fluid of the cutting device. The blade consists of a pair of outer straight side walls or plates 34 spaced from each other, and converged at their outlet ends to form an outlet nozzle 35 for the total width of the blade. The plates 34 are connected at their side edges by the curved connecting portions 36. An inner pair of walls or plates 37 have their body portions parallel to the plates 34 and are spaced therefrom for nearly their full lengths. The upper ends 38 of the plates 37 are preferably flared and fastened to the plates 34. The lower ends 39 of the inner plates 37 converge to form the outlet opening 40 and are fastened to the lower portions of the inner faces of the outer plates 34. The outer plates 37 in this instance are made of one sheet of material, with a butt joint 41 where the ends of the plate meet. The inner plates are in this instance constructed in a manner similar to the outer plates 34. Heat insulating material 42, in this instance paper, is placed in the spaces between the plates 34 and 37, to prevent the heat of the operating fluid in the blade being conducted through the outer plates 34.

A central spacing and strengthening bar 43 is located between the inner faces of the plates 37 for nearly their full length and it is fastened to the plates 34 and 37, by means of the rivets 44. Spacing and strengthening bars 47 and 48 parallel to the bar 43 are located between the plates 37 and between the bar 43 and the curved portions 36. Washers 50 are located between the plates 37 adjacent to the outlet opening 40 and are connected to the blade by means of the rivets 51.

The bars 43, 47 and 48 divide the interior or chamber *b* of the blade A into the channels 53, 54, 55 and 56.

In Fig. 4 the cutting device is shown to consist of the hollow blade A' with the parallel plates 34 with the outlet opening 40, the pipe B and the operating handle with the brackets 28 and the handle bar 30, as already described. The outer plates 37 and heat insulating material 42 are omitted.

In Fig. 5 the cutting device is shown to consist of the hollow blade A² with the tapering plates 57 having the outlet opening 58 at their lower ends. The pipe B and operating handle with the brackets 28 and handle bar 30 are constructed as already described.

Referring to Figs. 7 and 8 the cutting device is indicated to comprise a pair of triangular shaped tapered hollow blades C and D, each of which is similar to the blade A. The outlet end 60 with its opening, of each of the blades C and D, is inclined to its longitudinal axis. Spacing and strengthening bars 62, 63 and 64 separate the plates of each of the blades C and D and washers 65 similar to 50 are connected to the plates of the blades C and D adjacent to the outlet ends 60. The blades C and D are respectively connected to the pipes E and F, in a manner similar to the connection between the blade A and pipe B. A cross pipe G connects the pipes E and F. A T 68, with the valve 69, nipple 70 and hose 71 are connected to the pipe G. An operating handle comprises a pair of brackets 74, which have one end of each connected to the pipe G. A pin 75 connects the other ends of the brackets 74, and a handle bar 76 is supported on the pin 75 between the brackets 74. The brackets 74 are preferably located in a direction perpendicular to the outlet openings 60. Guide runners 78, may extend from the forward ends of the pipes C and D.

Referring to Figs. 9 and 10, the cutting device is shown to comprise the connected blades H, I and J, which are each similar to the blade A, and that in this instance are made of one sheet of material with the edges of the sheet to form a butt joint 80 in one of the blades. The blade H connects the blades I and J and the blades at their junction are narrowed at their upper ends as indicated at 83, to permit them to be easily connected to the inlet pipes 85, 86 and 87, which are similar to the pipe B. A T 90 with the valve 91 and hose 92 are connected to the pipe 87. An operating handle with the handle bar 95 is connected to the pipes 86 and 87.

To use the cutting device and referring to Figs. 1, 2 and 3, steam or other heated fluid is supplied by the hose 25. When the valve 22 is opened the steam enters the supply pipe B. From the latter the steam enters the blade A and flows down the channels 53 to 56, and issues from the outlet opening 40. The operator locates the nozzle 35 of the blade, upon the piece of ice or other frozen material to be cut, and the steam or other heated fluid, flowing in a stream from the opening 40 cuts an opening in said ice or material. After the cut has been made the blade is lifted by means of the handle bar 30. The insulating material 42 preserves the heat in the steam or other operating fluid, for the stream that is discharged from the opening 40, and prevents loss of ice due to the melting thereof, if the blade A were not heat insulated.

In Figs. 7 and 8 the cutting device is shown cutting the cake of ice 100 in horizontal direction. The steam or other hot operating fluid is supplied by the hose 71 and flows from the openings in the outlet ends 60. The blades are moved horizontally by means of the handle bar 76. The guide runners 78 slide upon the top face of the cake of ice and maintain the cutting device in operative position. The modification indicated in Figs. 9 and 10 is used in a manner similar to that described for Figs. 1, 2 and 3.

Various other modifications may be made in the invention without departing from the spirit thereof, and the present exemplification is to be taken as illustrative and not limitative thereof.

Having described my invention what I desire to secure by Letters Patent and claim is:

1. In a cutting device the combination of a supply pipe, a hollow blade with an outlet opening, extending from the pipe, said blade having side walls spaced from each other and spacing and strengthening bars in the blade connected to said side walls, the interior of the blade and the pipe forming connecting passages for a fluid.

2. In a cutting device the combination of a supply pipe for a heated fluid, a hollow blade connected to said pipe, said blade having an outlet opening, the interior of the pipe and the interior of the blade forming connected passages for a fluid and means to insulate the walls of the blade substantially as described.

3. In a cutting device the combination of a supply pipe for a fluid, a hollow blade connected to said pipe, said blade having an outlet opening, the interior of the blade and the interior of the pipe forming passages for the fluid, said blade having interior and outer side walls and a heat insulating material located between said interior and outer walls substantially as described.

4. In a cutting device the combination of a supply pipe, a hollow blade with an inlet opening and an outlet opening, the interior of the blade connected to the interior of the pipe, said blade comprising inner walls and outer walls encircling the inner walls, a heat insulating material between said inner and outer walls, and spacing and strengthening bars in the blade between its inner walls, substantially as described.

5. In a cutting device the combination of a plurality of connected supply pipes for a fluid, a hollow blade with an outlet opening extending from each pipe, the pipes and blades forming passages for the fluid to be discharged from the openings of the blades and heat insulating means for each blade.

6. In a cutting device the combination of a pair of supply pipes, a cross pipe connecting the supply pipes, a hose for steam connected to the cross pipe and a hollow blade with an inlet opening and an inclined end with an outlet opening connected to each supply pipe, the interior of each pipe connected to the interior of its blade, substantially as described.

7. In a cutting device the combintion of a pair of supply pipes, a cross pipe connecting the supply pipes, means to supply steam to the cross pipe, a hollow blade connected to each of said supply pipes with its interior connecting with the interior of its pipe, each of said blades having an outlet opening inclined to the longitudinal axis of its supply pipe and a guide runner extending from each supply pipe, substantially as described.

Signed at Bayonne in the county of Hudson and State of New Jersey this 5th day of May A. D. 1922.

PETER DOW.